April 18, 1967 W. R. SHERIDAN 3,314,130

METHOD OF MAKING HOLLOW ELECTRONIC COMPONENTS

Filed March 23, 1964

INVENTOR.
WILLIAM R. SHERIDAN
BY
*J. R. Sheridan*
ATTORNEY

United States Patent Office 3,314,130
Patented Apr. 18, 1967

3,314,130
METHOD OF MAKING HOLLOW ELECTRONIC COMPONENTS
William R. Sheridan, Buffalo, N.Y., assignor, by mesne assignments, to the United States of America as represented by the Secretary of the Navy
Filed Mar. 23, 1964, Ser. No. 354,186
2 Claims. (Cl. 29—155.5)

This invention relates to the production of small or miniaturized components by electroforming and in particular, the invention is directed to a novel method of electroforming such components which have irregular internal shapes or configurations.

Small electronic components such as hollow wave guides which are used in microwave signalling have a variety of shapes depending upon the particular electronic functions to be carried out and generally are of straight wall form, elbow form, or other curved forms and usually require small hollow components such as fittings, couplings and connectors for installation in other electrical equipment of a system.

The most important considerations in the manufacturing of such electronic components reside in the provision of accurate internal dimensions and in the formation of accurately contoured interior surfaces. It is known in the prior art that certain forms of wave-transmitting elements and wave guides may be built by means of a mandrel of desired shape and desired contoured inner surface and the wave guide or other component removed from the mandrel to then permit the mandrel to be reused in forming other components. It is also known that disposable mandrels may be used for electroforming the wave guides or other components and the disposable mandrels removed from the completed articles by mechanical means, by melting under heat or by dissolving by suitable acids. The electrical components are formed on the mandrels by depositing a layer of conductor metal to a desired thickness onto the mandrel and for best results it is necessary to chemically treat or coat the mandrel so that the electrodeposited material does not unite with the mandrel and after formation of the wave guide or other component, the mandrel is removed for reuse or, if it is of the disposable type, it is destroyed by melting or dissolving from the composite structure.

Difficulties have been experienced with some prior art electroforming processes utilizing the disposable type of mandrel. Aluminum has been used to form a disposable mandrel of desired contour, etc. but is somewhat expensive to preform to the desired shape since and particularly for complicated shapes, aluminum requires substantial machining time and also requires a dissolvent which will not attack the aluminum. Fusible alloys, such as bismuth and lead compositions have been used and are satisfactory in that they may be readily preformed to desired shape in a mold without machining but portions of the fusible alloy tend to adhere to the inner irregular surfaces of the electrodeposited conductor material and form uneven surfaces which result in high electrical losses when such products are used in electrical circuitry.

The broad object of the present invention resides in the method of producing hollow electroformed electrical components in an inexpensive and efficient manner.

Another object of the invention concerns the method of producing miniaturized hollow electrical components having accurate inner dimensions.

Another object of the invention is directed to the method of producing hollow components of electrically conductive material which operate with extreme efficiency in electrical circuitry.

Further objects of the invention will be apparent from a more detailed explanation of the invention taken in conjunction with the accompanying drawings wherein.

Figure 1:
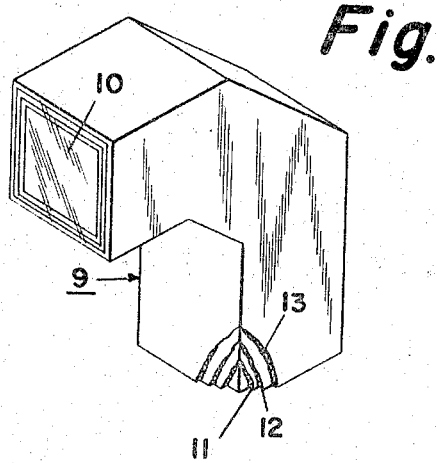
FIGURE 1 is a view in perspective of an assembly of a wave guide mandrel having the various layers of materials used in the process applied thereto.
Figure 2:
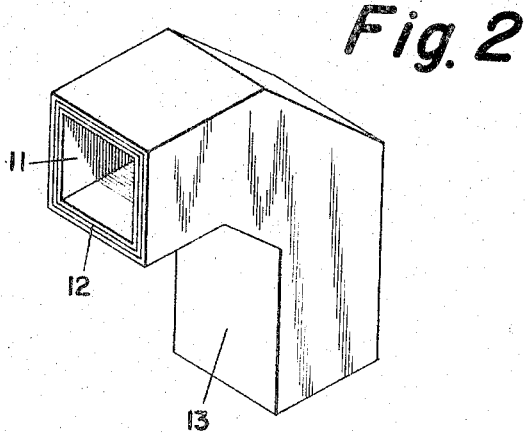
FIGURE 2 is a view similar to FIGURE 1 but showing the mandrel removed.
Figure 3:
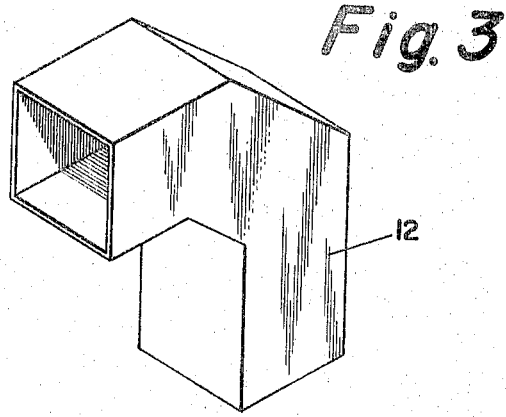
FIGURE 3 is a view similar to FIGURE 1 but showing only the wave guide resulting from the method of the invention.

In FIGURE 1, 9 indicates the assembly of a wave guide mandrel which is indicated at 10 and is formed of an inexpensive alloy. At 11 is indicated a thin inner layer of barrier metal which is electroplated to the mandrel 10, followed by a layer of conductor material 12 which is electroplated to the layer of barrier material 11 and which is then followed by a thin outer layer of barrier material indicated at 13.

Figure 4:
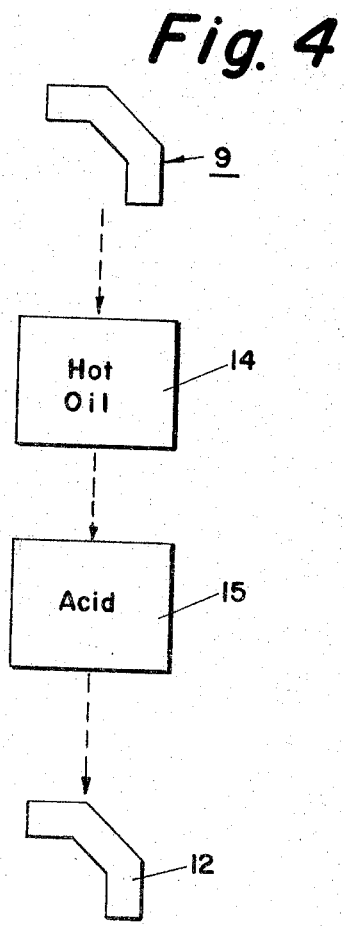
FIGURE 4 is a schematic view showing the various method steps involved in producing the wave guide of FIGURE 3.

In FIGURE 4 the several steps of treating the assembly of FIGURE 1 are set out and the first step is the placing of the assembly 9 in a hot oil bath indicated at 14 which is maintained at a temperature sufficient to melt out the mandrel portion 10 but is below the melting point of the barrier layers 11 and 13. A temperature in the range of 250° to 300° F. will be found satisfactory for this purpose since the preferred alloys, which will be mentioned later, will melt within this temperature range. The assembly is then treated to first remove any of the alloy remaining on the inner face of the plating 11 and then to remove the barrier layers 11 and 13 leaving the final product 12 as shown in FIGURE 4. The numeral 15 represents a stage for these treatments. Any alloy material of the mandrel 10 which remains on the inner barrier material 11 is removed by etching with a ferric chloride solution which is sufficiently strong for this purpose but which is sufficiently weak to prevent any substantial removal of the barrier layer 11. The barrier layers 11 and 13 are then removed by acetic acid or by hydrogen peroxide which will not attack the conductor material 12. The fusible mandrel 10 of the assembly of FIGURE 1 will preferably be an alloy marketed under the trademark Cerrobase by Cerro Sales Corporation, 300 Park Ave., New York, N.Y., and constituted of approximately 55.5 percent bismuth and 44.5 percent lead. This alloy has a melting point of about 255° F. and is relatively inexpensive; however, other fusible alloys containing bismuth and lead, or bismuth and tin, which melt in the range set forth above, or between approximately 250° F. and 300° F. may be used advantageously.

The conductor material 12 of the wave guide assembly of FIGURE 1 will preferably be silver or copper. Other conductors, such as brass, magnesium or aluminum may be used but it will be neccessary to select solvents which have no adverse effect on the conductor material. The barrier layers 11 and 13 will preferably be formed of thin layers of lead of the order of .0005 inch since this metal is not adversely affected by the ferric acid and is removable by the acetic acid or hydrogen peroxide. Other barrier materials such as zinc, or mercury, or their alloys, may be used but the solvents employed for their removal must be selected so as to have no adverse effect on the particular conductor material used.

It will be understood that the specific form of wave guide described and shown in the drawing is merely illustrative of a large class of structures which may be produced in accordance with the invention and that the invention is, accordingly, not limited to the disclosed embodiment but may take various modifications without depart-

I claim:

1. The method of making a hollow electronic wave guide which comprises:
   (a) selecting an alloy consisting of approximately 55.5 percent bismuth and 44.5 percent lead,
   (b) shaping the alloy to provide a mandrel having outer surfaces between its ends which determine the internal configuration of the wave guide,
   (c) applying a thin inner layer of lead to cover said outer surfaces of the mandrel,
   (d) applying a layer of conductor material selected from the group comprising silver and copper to cover the inner layer of lead,
   (e) applying a thin outer layer of lead to cover the conductor material,
   (f) subjecting the mandrel and applied layers assembly to a hot oil bath maintained at a temperature of approximately 255° F. to melt the alloy forming the mandrel,
   (g) subjecting the inner layer of lead to a solution of ferric chloride to completely remove any alloy therefrom and
   (h) removing the inner and outer layers of lead by a solvent solution selected from the group comprising acetic acid and hydrogen peroxide.

2. The method of making a hollow electronic wave guide which comprises:
   (a) selecting an alloy consisting of approximately 55.5 percent bismuth and 44.5 percent lead,
   (b) shaping the alloy to provide a mandrel having outer surfaces between its ends which determine the internal configuration of the wave guide,
   (c) electrodepositing an inner layer of lead of approximately .0005 inch in thickness to cover said outer surfaces of the mandrel,
   (d) electrodepositing a layer of conductor material selected from the group comprising silver and copper to cover the inner layer of lead,
   (e) electrodepositing an outer layer of lead of approximately .0005 inch in thickness to cover the conductor material,
   (f) subjecting the mandrel and applied layers assembly to a hot oil bath maintained at a temperature of approximately 255° F. to melt the alloy forming the mandrel,
   (g) subjecting the inner layer of lead to a solution of ferric chloride to completely remove any alloy therefrom and
   (h) removing the inner and outer layers of lead by a solvent solution selected from the group comprising acetic acid and hydrogen peroxide.

References Cited by the Examiner

UNITED STATES PATENTS

| | | | |
|---|---|---|---|
| 699,592 | 5/1902 | Thompson | 29—502 |
| 1,776,535 | 9/1930 | Bekk | 156—14 |
| 2,004,102 | 6/1935 | Dickey | 204—9 |
| 2,592,614 | 4/1952 | Stoddard | 29—155.5 |
| 2,613,178 | 10/1952 | Grant | 29—155.5 |
| 2,834,915 | 5/1958 | Dench. | |
| 2,992,946 | 7/1961 | Arden et al. | 156—18 X |

JOHN F. CAMPBELL, *Primary Examiner.*

J. M. ROMANCHIK, *Assistant Examiner.*